United States Patent
Yourist

(10) Patent No.: US 8,550,272 B2
(45) Date of Patent: Oct. 8, 2013

(54) EXTRUSION BLOW MOLDED PET CONTAINER HAVING SUPERIOR COLUMN STRENGTH

(75) Inventor: Sheldon E. Yourist, York, PA (US)

(73) Assignee: Graham Packaging Company, LP, York, PA (US)

( * ) Notice: Subject to any disclaimer, the term of this patent is extended or adjusted under 35 U.S.C. 154(b) by 424 days.

(21) Appl. No.: 12/836,258

(22) Filed: Jul. 14, 2010

(65) Prior Publication Data

US 2012/0012595 A1    Jan. 19, 2012

(51) Int. Cl.
*B65D 90/02*    (2006.01)

(52) U.S. Cl.
USPC ........... 215/382; 215/379; 215/396; 215/398; 215/384; 215/40; 215/42; 220/669; 220/675; 220/752

(58) Field of Classification Search
USPC ............... 215/396, 398, 40, 42; 220/669, 675
See application file for complete search history.

(56) References Cited

U.S. PATENT DOCUMENTS

| | | | | | |
|---|---|---|---|---|---|
| 261,113 | A | * | 7/1882 | Wendt | 215/235 |
| D189,002 | S | * | 10/1960 | Campbell | D9/534 |
| D189,996 | S | * | 3/1961 | Stenger et al. | D9/531 |
| 3,069,039 | A | * | 12/1962 | Stickney | 215/44 |
| 3,251,514 | A | * | 5/1966 | Speicher | 222/468 |
| D207,130 | S | * | 3/1967 | Drucker | D9/531 |
| 4,127,206 | A | * | 11/1978 | Virog et al. | 215/385 |
| 4,194,641 | A | * | 3/1980 | Gaiser | 215/398 |
| 4,257,525 | A | * | 3/1981 | Thompson | 215/396 |
| 4,572,384 | A | * | 2/1986 | Vesborg | 215/385 |
| 4,634,028 | A | * | 1/1987 | de Larosiere | 222/464.2 |
| 4,881,652 | A | * | 11/1989 | Schiemann | 220/23.8 |
| 5,057,266 | A | * | 10/1991 | Belcher | 264/513 |
| 5,101,990 | A | * | 4/1992 | Krishnakumar et al. | 215/383 |
| 5,217,128 | A | * | 6/1993 | Stenger | 215/370 |
| D337,921 | S | * | 8/1993 | Iodice | D7/511 |
| D339,067 | S | * | 9/1993 | Rokus | D9/531 |
| 5,320,231 | A | * | 6/1994 | Iodice | 215/385 |
| 5,322,184 | A | * | 6/1994 | Bergner et al. | 220/771 |
| 5,355,710 | A | * | 10/1994 | Diekhoff | 72/379.4 |

(Continued)

FOREIGN PATENT DOCUMENTS

JP    2008213855 A * 9/2008

OTHER PUBLICATIONS

Partial International Search Report from International Application No. PCT/US2011/042166, Aug. 7, 2011.

*Primary Examiner* — Anthony Stashick
*Assistant Examiner* — Chetan Chandra
(74) *Attorney, Agent, or Firm* — Baker Botts LLP

(57) ABSTRACT

An extrusion blowmolded PET container having superior top load strength characteristics includes a sidewall having an outer surface, and an inner surface that defines an interior space. The sidewall is fabricated from a material that includes extrudable PET. The sidewall is shaped to define a bottom portion, a finish portion and a main body portion. The finish portion has an opening defined therein that is in communication with the interior space. The main body portion has a neck surface, a shoulder surface and a fillet that is defined between the neck surface and the shoulder surface. The neck surface forms a first angle with respect to a longitudinal axis of the container that is substantially within a range of about 2° to about 20°, and the fillet has an average radius of curvature that is substantially within a range of about 15 mm to about 55 mm. The container is preferably fabricated using an extrusion blowmolding process.

28 Claims, 8 Drawing Sheets

(56) References Cited

U.S. PATENT DOCUMENTS

| | | |
|---|---|---|
| D353,331 S | 12/1994 | Larkin et al. |
| 5,535,901 A * | 7/1996 | Ishii et al. ............. 215/396 |
| D385,748 S | 11/1997 | Iodice et al. |
| 5,908,136 A * | 6/1999 | Mrak ..................... 220/756 |
| 5,954,216 A * | 9/1999 | Meisner et al. ......... 215/398 |
| 6,012,597 A * | 1/2000 | Nishihara et al. ...... 215/398 |
| 6,029,837 A * | 2/2000 | Slat et al. ............... 215/384 |
| 6,338,415 B1 * | 1/2002 | Grob ...................... 215/398 |
| D464,139 S | 10/2002 | Iodice |
| D470,593 S | 2/2003 | Iodice |
| 6,672,468 B1 * | 1/2004 | Mount et al. ........... 215/42 |
| 6,910,596 B2 * | 6/2005 | Herckner ................ 215/398 |
| 7,097,060 B2 * | 8/2006 | Penny et al. ............ 215/384 |
| 7,137,521 B2 * | 11/2006 | Yourist .................. 215/398 |
| 7,182,214 B2 * | 2/2007 | Darr et al. .............. 215/398 |
| 7,357,267 B1 * | 4/2008 | Shimada et al. ........ 215/381 |
| 8,016,148 B2 * | 9/2011 | Walsh ..................... 220/288 |
| 2003/0006210 A1 * | 1/2003 | Iizuka et al. ............ 215/398 |
| 2003/0042222 A1 * | 3/2003 | Wurster et al. ......... 215/379 |
| 2003/0116521 A1 * | 6/2003 | Chupak .................. 215/40 |
| 2003/0173328 A1 * | 9/2003 | Herckner ................ 215/398 |
| 2003/0234236 A1 * | 12/2003 | Michalowski ........... 215/398 |
| 2004/0164048 A1 * | 8/2004 | Yourist .................. 215/398 |
| 2005/0139568 A1 * | 6/2005 | Falk ....................... 215/12.2 |
| 2006/0065619 A1 * | 3/2006 | Warren et al. .......... 215/398 |
| 2007/0187413 A1 * | 8/2007 | Gruskin et al. ......... 220/500 |
| 2007/0262047 A1 * | 11/2007 | Agrawal et al. ......... 215/398 |
| 2010/0059532 A1 | 3/2010 | Heisner |
| 2010/0200531 A1 * | 8/2010 | Komiya et al. ......... 215/40 |
| 2010/0264107 A1 * | 10/2010 | Lonsway et al. ........ 215/40 |
| 2011/0000869 A1 * | 1/2011 | Braun et al. ............ 215/40 |
| 2011/0066117 A1 * | 3/2011 | Post et al. ............... 604/257 |
| 2011/0226724 A1 * | 9/2011 | Deemer et al. ......... 215/398 |
| 2012/0000878 A1 * | 1/2012 | Reisig .................... 215/40 |
| 2012/0024813 A1 * | 2/2012 | Nakagawa et al. ...... 215/40 |

* cited by examiner

EXTRUSION BLOW MOLDED PET CONTAINER HAVING SUPERIOR COLUMN STRENGTH

BACKGROUND OF THE INVENTION

1. Field of the Invention

This invention relates generally to the field of packaging, and more specifically to the field of transparent plastic containers that are fabricated from an extrudable PET material using an extrusion blowmolding process.

2. Description of the Related Technology

Many products that were previously packaged using glass containers are now being supplied in plastic containers. Polyethylene terephthalate (PET) thermoplastic resins are polyester materials that provide clarity and transparency that is comparable to glass. PET possesses the processing characteristics, chemical and solvent resistance and high strength and impact resistance that are required for packaging products such as juices, soft drinks and water. PET containers are lightweight, inexpensive, recyclable and can be economically manufactured in large quantities. They will not shatter and create potentially dangerous shards when dropped, as glass containers may.

PET containers have conventionally been manufactured using the stretch blow molding process. This involves the use of a pre-molded PET preform having a threaded portion and a closed distal end. The preform is first heated and then is longitudinally stretched and subsequently inflated within a mold cavity so that it assumes the desired final shape of the container. As the preform is inflated, it elongates and stretches, taking on the shape of the mold cavity. The polymer solidifies upon contacting the cooler surface of the mold, and the finished hollow container is subsequently ejected from the mold.

Another well-known process for fabricating plastic containers is the extrusion blow molding process, in which a continuously extruded hot plastic tube or parison is captured within a mold and inflated against the inner surfaces of the mold to form a container blank. In such systems, the mold is typically designed to travel at the speed at which the extruded parison is moving when it closes on the parison so that the process can operate on a continuous basis. There are several different types of extrusion blow molding machines, including shuttle molds that are designed to travel in a linear motion and extrusion blow molding wheels that travel in a rotary or circular motion.

Extrusion blow molding is typically used to form plastic containers, such as motor oil containers, from nontransparent materials such as polyolefin or polyethylene. In the past, it was not typical to use extrusion blow molding to fabricate PET containers, because no commercially available PET material provided the required melt strength for extrusion blowmolding in addition to being compatible with standard PET recycling processes. More recently, however, extrudable PET materials have been made commercially available that can be processed at temperatures and conditions similar to standard PET and that provide the required melt strength for extrusion blow molding. Such materials have higher melt temperatures than the polyethylene or polyolefin materials that are typically used with extrusion blowmolding. A limited number of PET containers that are fabricated using extrusion blow molding have now been commercially introduced.

Despite the advantages of plastic materials such as PET, glass containers are still prevalent for certain products, such as liquor bottles. One of the reasons for this is that containers such as liquor bottles require a substantial amount of column or top load strength so that the structural integrity of the container is not compromised when the containers are stacked in boxes or pallets and subjected to substantial vertical compressive forces. In many container designs, the neck and shoulder portions are the weakest link in terms of the column strength of the container. In order to minimize material costs, it is desirable to make the sidewall of these container portions, as with the rest of the container, as thin as possible. However, such lightweighting comes at the expense of container strength, and in particular column strength.

Known measures for enhancing column strength in stretch blow molded PET containers include the provision of such features as vertical ribs. However, the formation of such features may not be practical using an extrusion blow molding process. Moreover, such features may not be aesthetically compatible with the intended product. For example, consumers may expect a liquor bottle to resemble a glass liquor bottle and have substantially smooth neck and shoulder portions.

A need exists for a PET container that can be manufactured using an extrusion blow molding process that exhibits superior column strength, particularly in the neck and shoulder portions of the container, without compromising the aesthetic character of the container.

SUMMARY OF THE INVENTION

Accordingly, it is an object of the invention to provide a PET container that can be manufactured using an extrusion blow molding process that exhibits superior column strength, particularly in the neck and shoulder portions of the container, without compromising the aesthetic character of the container.

In order to achieve the above and other objects of the invention, an extrusion blowmolded PET container having superior top load strength characteristics according to a first aspect of the invention includes a sidewall having an outer surface, and an inner surface that defines an interior space. The sidewall is fabricated from a material that includes extrudable PET. The sidewall is shaped to define a bottom portion, a finish portion and a main body portion. The finish portion has an opening defined therein that is in communication with the interior space. The main body portion has a neck surface, a shoulder surface and a fillet that is defined between the neck surface and the shoulder surface. The neck surface forms a first angle with respect to a longitudinal axis of the container that is substantially within a range of about 2° to about 20°, and the fillet has an average radius of curvature that is substantially within a range of about 15 mm to about 55 mm.

According to a second aspect of the invention, a method of making a PET container includes steps of continuously extruding a parison of a plastic material comprising PET and capturing a portion of the parison in a mold. The captured portion of the parison is inflated against the interior of the mold in order to form a PET container having a main body portion with a neck surface, a shoulder surface and a fillet that is defined between the neck surface and the shoulder surface. The neck surface forms a first angle with respect to a longitudinal axis of the container that is substantially within a range of about 2° to about 20°. The fillet has an average radius of curvature that is substantially within a range of about 15 mm to about 55 mm. The container is then removed from the mold.

A plastic container according to a third aspect of the invention includes a plastic sidewall having an outer surface, and an inner surface that defines an interior space. The sidewall is shaped to define a bottom portion, a finish portion having an opening defined therein that is in communication with the interior space, and a main body portion. The main body portion has a handle portion defined therein and a finger access opening defined adjacent to the handle portion. The finger access opening has a concave upper surface, and the concave upper surface includes a first curved portion that is proximate to the longitudinal axis of the container and a second curved portion that is proximate to the handle portion. The first curved portion has a radius of curvature that is greater than a radius of curvature of the second curved portion.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
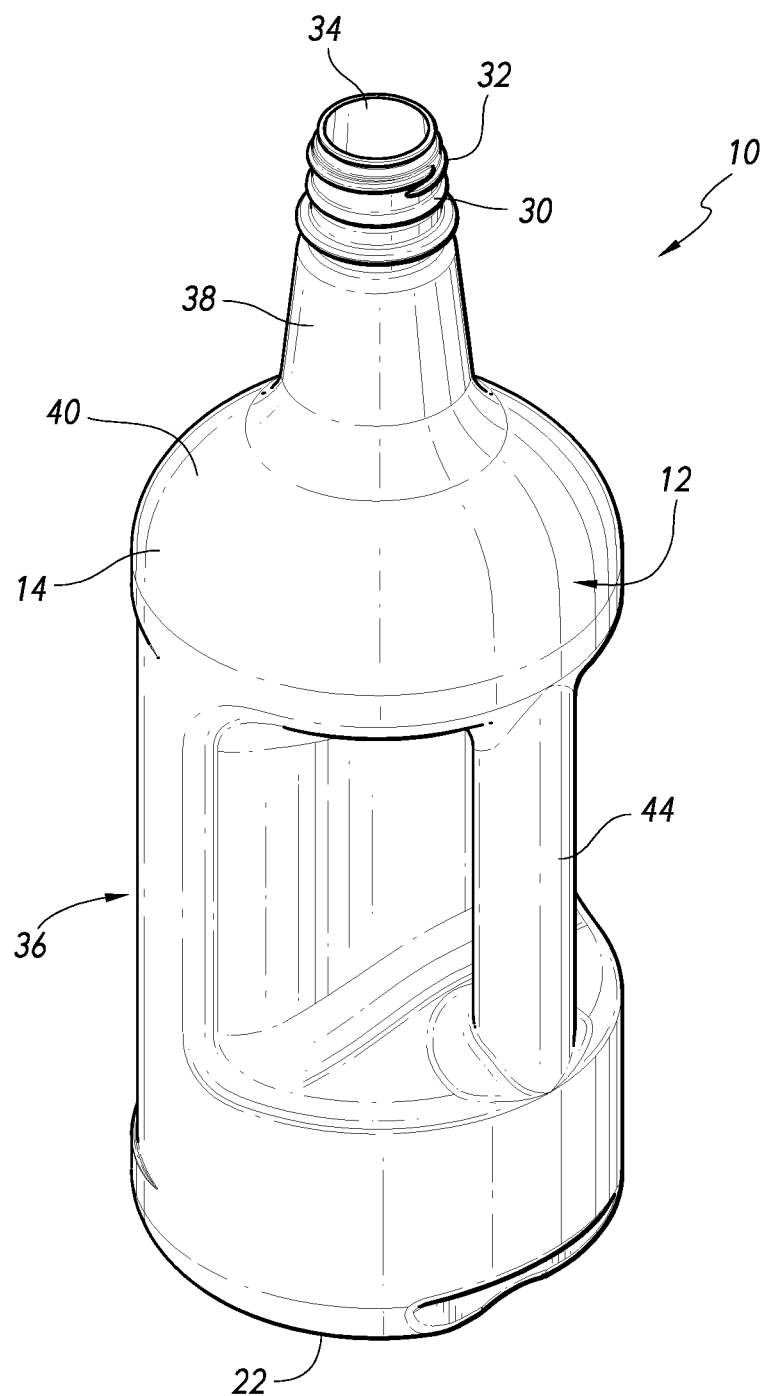
FIG. 1 is a perspective view depicting a plastic container that is constructed according to a preferred embodiment of the invention.
Figure 2:
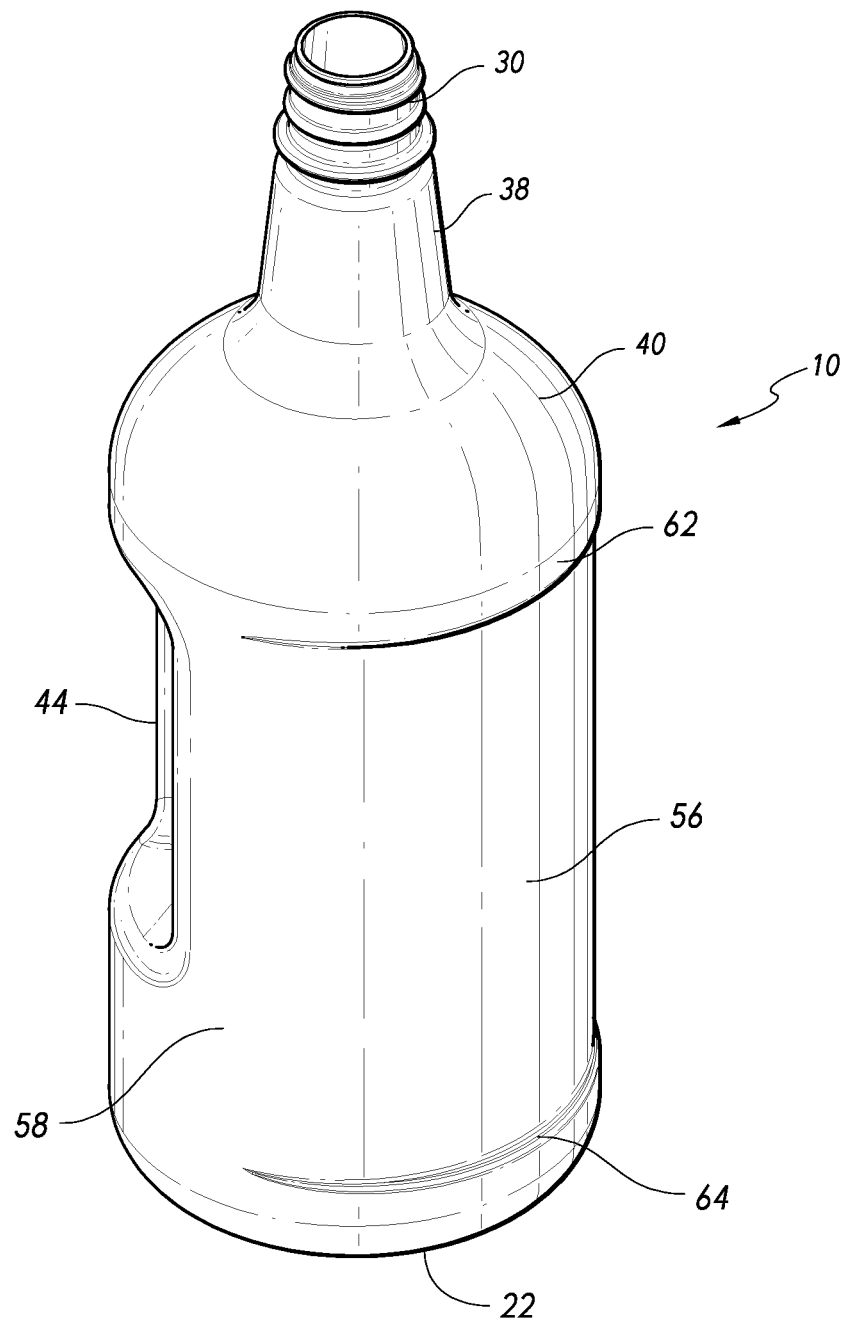
FIG. 2 is another perspective view depicting the plastic container that is shown in FIG. 1.
Figure 3:
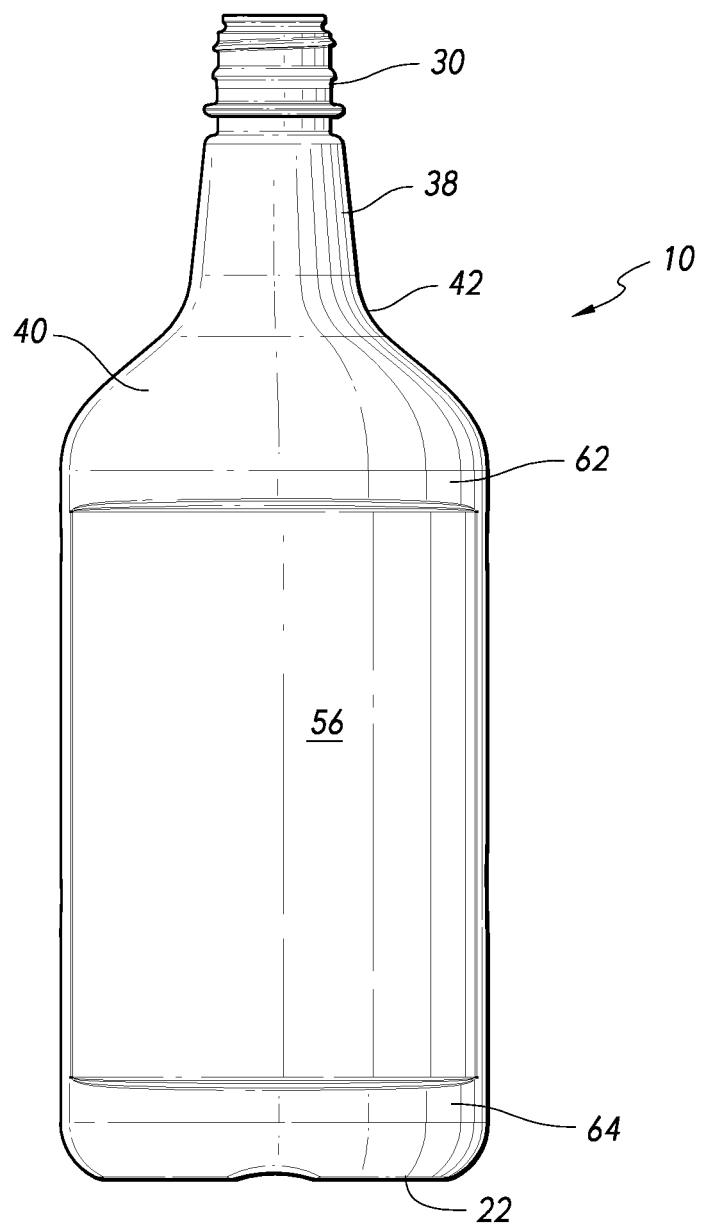
FIG. 3 is a front elevational view depicting the plastic container that is shown in FIG. 1.

Referring now to the drawings, wherein like reference numerals designate corresponding structure throughout the views, and referring in particular to FIG. 1, an extrusion blowmolded PET container 10 that is constructed according to a preferred embodiment of the invention includes a sidewall 12 that is preferably fabricated from a clear, transparent plastic material. In the preferred embodiment, the entire container 10 is fabricated as a single unitary piece from an extrudable polyethylene terephthalate (PET) material, such as that which is commercially available from Eastman Chemical Company under the brand name AMPHORA EN177, or alternatively Invista 505G.

Figure 4:
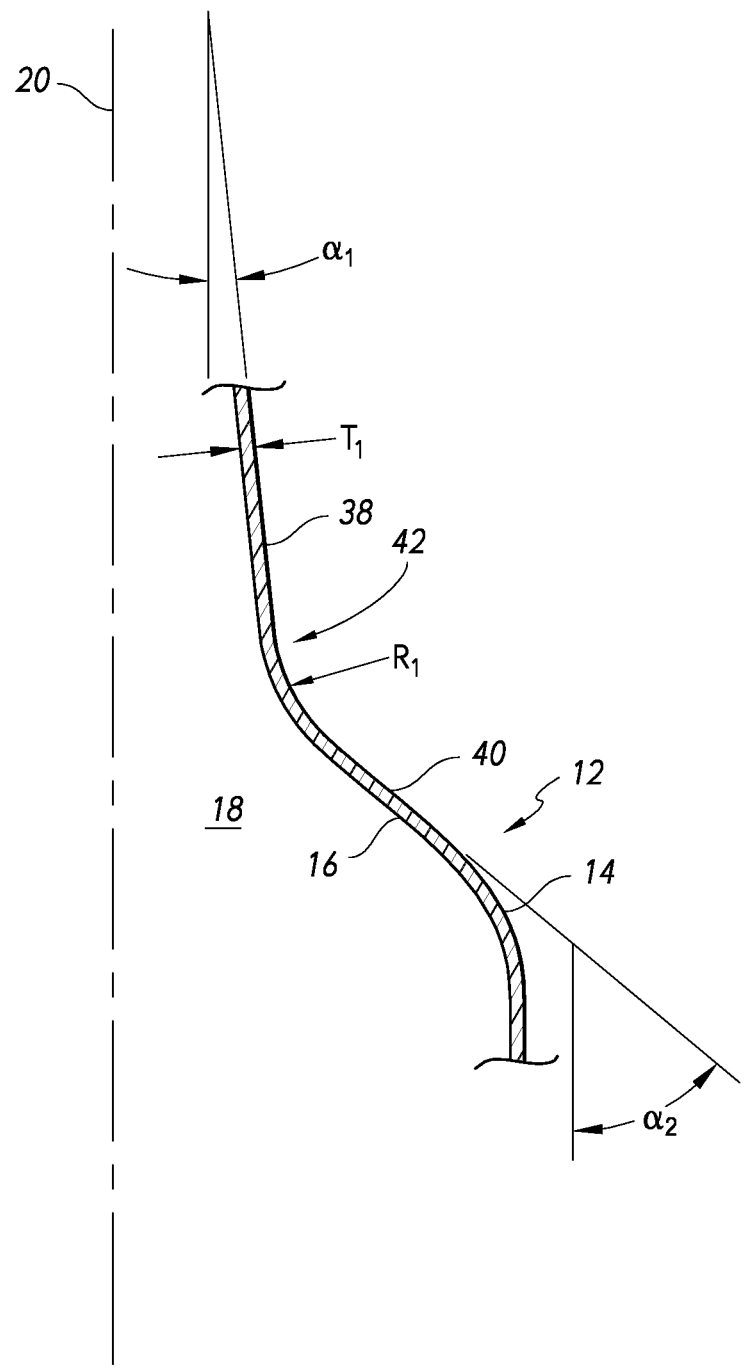
FIG. 4 is a diagrammatical fragmentary cross-sectional view depicting a portion of the plastic container that is shown in FIG. 3.
Figure 5:
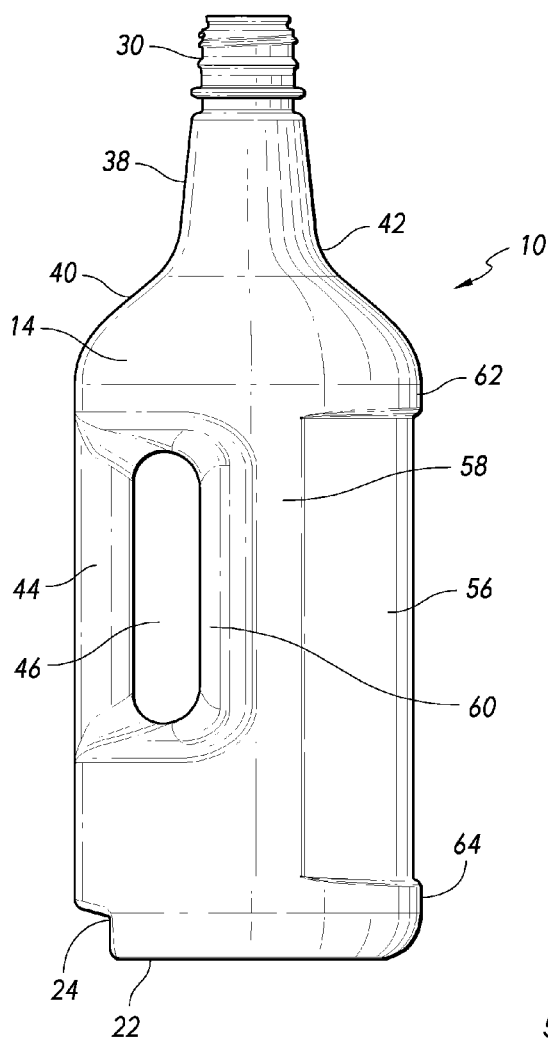
FIG. 5 is a first side elevational view of the container that is shown in FIG. 1.
Figure 6:
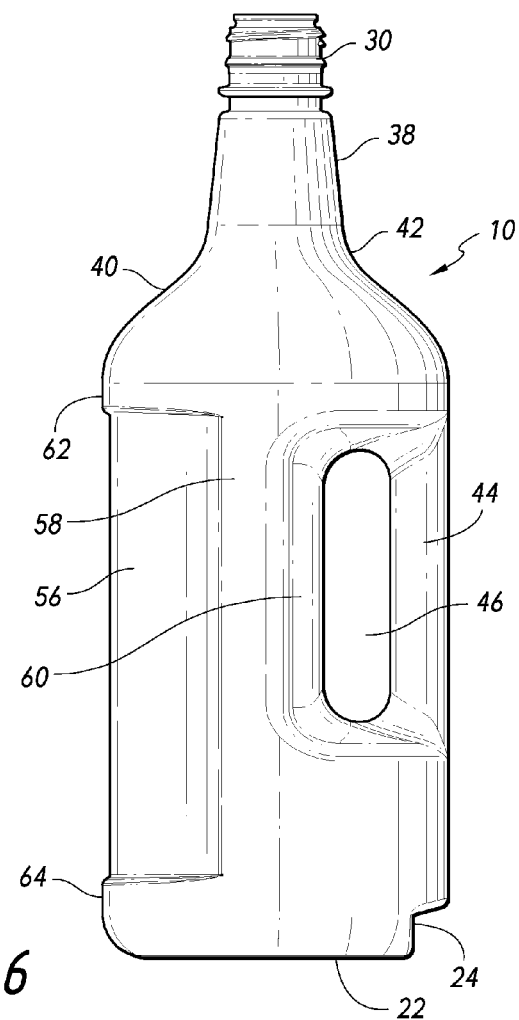
FIG. 6 is a second side elevational view of the container that is shown in FIG. 1.
Figure 7:
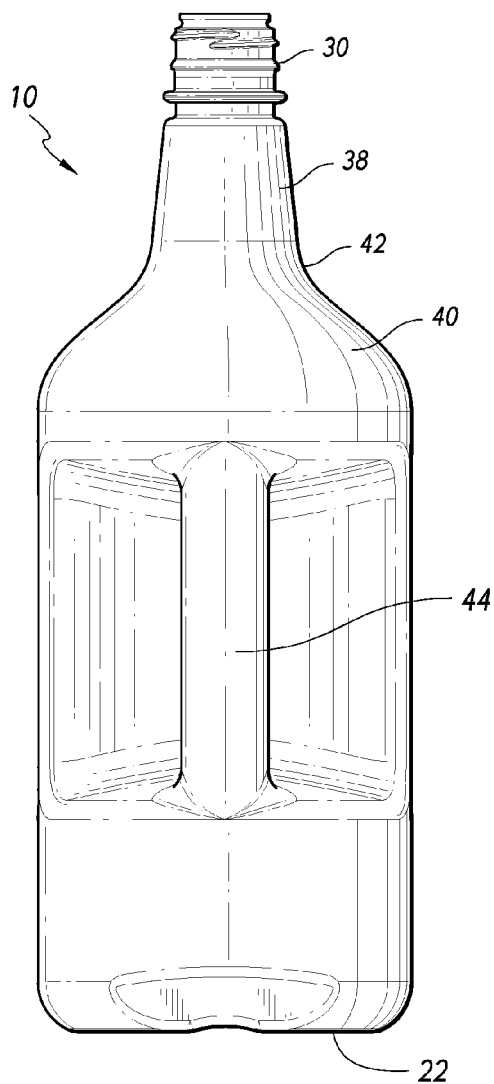
FIG. 7 is a rear elevational view of the container that is shown in FIG. 1.

Referring briefly to FIG. 4, which is a fragmentary longitudinal cross-section taken through a portion of the sidewall 12, the sidewall 12 includes an outer surface 14 and an inner surface 16 that defines an interior space 18 of the container 10. The container 10 has a longitudinal axis 20, which is shown in FIG. 4.

Figure 8:
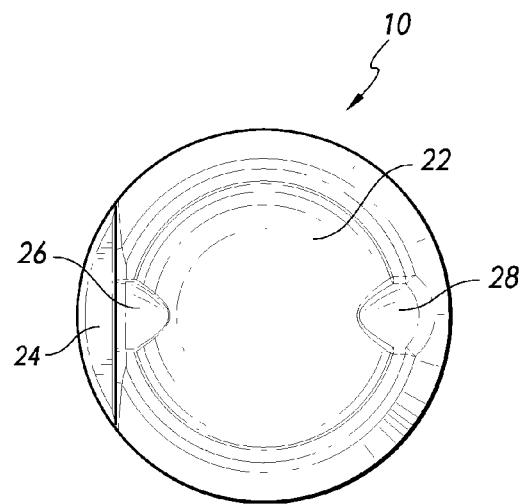
FIG. 8 is a bottom plan view of the container that is shown in FIG. 1.
Figure 9:
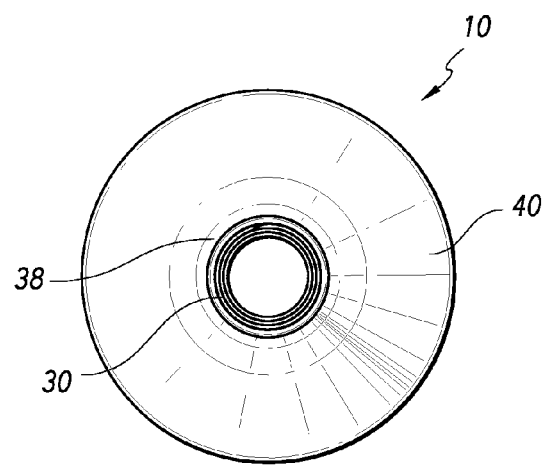
FIG. 9 is a top plan view of the container that is shown in FIG. 1.

As is best shown in FIGS. 1 and 8, the container 10 has a bottom portion 22 that is adapted to support the container 10 on a horizontal underlying surface in a stable manner, without rocking. Bottom portion 22 includes a recess 24 in a rear side thereof that has a substantially flat inner surface. Recess 24 facilitates alignment of the container 10 within a with respect to the conveyor and filling systems in a production facility during the process of filling the container 10 and applying an appropriate closure. The bottom portion 22 also preferably has first and second channels 26, 28 defined therein, which are in alignment with the parting lines of an extrusion blowmold that is used to manufacture the container 10, as will be discussed in greater detail below. The presence of the channels 26, 28 accordingly prevents any residual flash material that may exist at the parting lines from affecting the stability of the container 10 when it is placed on a flat surface such as a shelf.

The container 10 also preferably has a finish portion 30, which has at least one external helical thread 32 defined thereon. Finish portion 30 defines an opening 34 that is in communication with the interior space 18 of the container 10. Alternatively, finish portion 30 may have structure other than a helical thread for facilitating attachment of a closure. For example, it may have a circumferential flange for attaching a non-removable closure, which could be a dispensing closure.

As may be seen throughout the views, the container 10 has a main body portion 36 that includes a neck surface 38 and a shoulder surface 40. In the preferred embodiment, both the neck surface 38 and the shoulder surface 40 are shaped so as to be substantially symmetrical about the longitudinal axis 20 of the container 10. Both the neck surface 38 and the shoulder surface 40 are also preferably shaped so as to be substantially smooth, with no features such as ribs defined thereon. In the preferred embodiment, the neck surface 38 and the shoulder surface 40 are shaped so as to resemble the corresponding portions of a conventional glass liquor bottle, such as a whisky bottle. Preferably, both the neck surface 38 and the shoulder surface 40 are shaped so as to have a substantially flat outer surface as viewed in longitudinal cross-section, as shown in FIG. 4, but either or both of these surfaces could alternatively have a slight curvature.

Container 10 is advantageously constructed to provided superior column strength, particularly in the neck and shoulder portions 38, 40, without compromising the aesthetic character of the container.

As FIG. 4 shows, the sidewall 12 has an average thickness $T_1$ in the neck and shoulder part of the main body portion that is preferably substantially within a range of about 0.35 mm to about 2.0 mm, more preferably substantially within a range of about 0.5 mm to about 1.2 mm, and most preferably substantially within a range of about 0.65 mm to about 0.9 mm.

The thickness of the sidewall 12 is accordingly much thinner than the thickness of the sidewall of a conventional comparable glass container, which typically has a thickness on the order of 4.75 mm to 5 mm. The extrudable PET material from which the sidewall 12 is fabricated is also much lighter than glass. Accordingly, the container 10 is lighter than a comparable glass container, which saves energy and transportation costs. Additional energy savings are created because PET is less energy intensive to mold and shape than glass. In addition, the container 10 is more space efficient than a comparable glass container because of the thinner sidewall.

Both the neck surface 38 and the shoulder surface 40 are preferably angled, as viewed in longitudinal cross-section as in FIG. 4, with respect to the longitudinal axis 20 of the container 10. As may best be seen in FIG. 4, a concave fillet 42 is preferably defined between the neck surface 38 and the shoulder surface 40.

The neck surface 38 preferably forms a first angle $\alpha_1$ with respect to a longitudinal axis of the container as viewed in longitudinal cross-section that is preferably substantially within a range of about 2° to about 20°, more preferably substantially within a range of about 3° to about 14°, and most preferably substantially within a range of about 4° to about 8°.

The fillet 42 has an average radius of curvature R1 that is preferably substantially within a range of about 15 mm to about 55 mm, more preferably substantially within a range of about 17 mm to about 40 mm and most preferably substantially within a range of about 20 mm to about 28 mm.

The shoulder surface 40 forms a second angle $\alpha_2$ with respect to the longitudinal axis 20 of the container 10 as viewed in longitudinal cross-section that is preferably substantially within a range of about 35° to about 65°, more preferably substantially within a range of about 40° to about 60° and most preferably substantially within a range of about 45° to about 55°.

As a result of this configuration, the column or top load strength of the neck and shoulder surfaces 38, 40 have been optimized. A top load or column strength of 90 pounds of force has been achieved by a container 10 so configured.

Container 10 also preferably includes a handle portion 44, which has a hollow interior that is part of the interior space 18 of the container 10. In the preferred embodiment, a finger access opening 46 that extends entirely through the main body portion 36 of the container 10 is provided adjacent to the handle portion 44. As is shown diagrammatically in FIG. 10, the finger access opening 46 preferably includes a concave upper surface 48 and a concave lower surface 54. The purpose of the concave upper and lower surfaces 48, 54 is to provide a comfortable gripping surface for a consumer's fingers. The configuration of the upper surface 48 is particularly important, because much of the force from the weight of the container 10 tends to be applied to the upper side of a consumer's index finger when the handle 40 is used to grip and carry the container 10.

Figure 10:
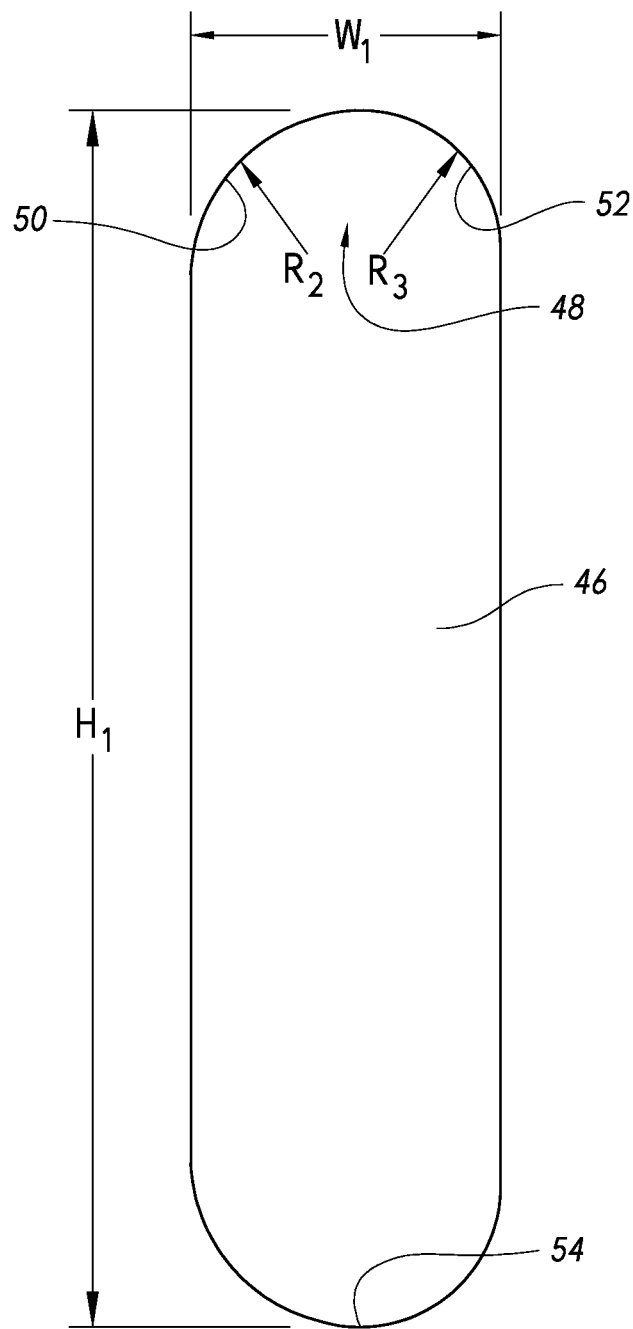
FIG. 10 is a diagrammatical depiction of the finger access opening in the container that is shown in FIG. 1.

As FIG. 10 shows, the finger access opening 46 has a maximum height $H_1$, and a maximum width W1 as viewed in diagrammatical side elevation. The maximum height $H_1$ is preferably substantially within a range of about 75 mm to about 120 mm, more preferably substantially within a range of about 80 mm to about 110 mm and most preferably substantially within a range of about 85 mm to about 95 mm. The maximum width $W_1$ of the finger access opening 46 is preferably substantially within a range of about 13 mm to about 35 mm, more preferably substantially within a range of about 15 mm to about 30 mm and most preferably substantially within a range of about 17 mm to about 25 mm.

In the preferred embodiment, the concave upper surface 48 includes a first curved portion 50 that is proximate to the longitudinal axis 20 of the container, and a second curved portion 52 that is distal from a longitudinal axis 20 of the container and proximate to the handle portion 44. The first curved portion 50 preferably has a first radius of curvature $R_2$, and the second curved portion 52 preferably has a second radius of curvature $R_3$. The first radius of curvature $R_2$ is preferably greater than the second radius of curvature $R_3$, which has the advantageous effect of making the concave upper surface 48 more comfortable for a consumer's index finger when gripping the container 10. This is because more of the relative force between the consumer's index finger and the upper surface 48 tends to be on the first portion 50 than the second portion 52. The particular feature could be used on any container that has a finger access opening, not just a PET container that is fabricated using extrusion blow molding.

The first radius of curvature $R_2$ of the first curved portion 50 preferably is substantially within a range of about 5 mm to about 50 mm, more preferably substantially within a range of about 8 mm to about 20 mm, and most preferably substantially within a range of about 10 mm to about 14 mm. It should be understood that these are average radii, as the radius of curvature $R_2$ may not be precisely constant. Preferably, however, it is nearly constant.

The second radius of curvature $R_3$ of the second curved portion 52 preferably is substantially within a range of about 3 mm to about 48 mm, more preferably substantially within a range of about 6 mm to about 18 mm, and most preferably substantially within a range of about 8 mm to about 12 mm. It should be understood that these are average radii, as the radius of curvature $R_3$ may not be precisely constant. Preferably, however, it is nearly constant.

A ratio $R_2/R_3$ of the first and second radii preferably is substantially within a range of about 1.05 to about 18, more preferably substantially within a range of about 1.1 to about 10, and most preferably substantially within a range of about 1.15 to about 1.3.

Alternatively, the second radius of curvature $R_3$ could be greater than the first radius of curvature $R_2$. In this alternative embodiment, the preferred values for $R_3$ would be the same as those disclosed above with respect to $R_2$ in the preferred embodiment, and vice versa. A ratio $R_3/R_2$ in this alternative embodiment would preferably be substantially within a range of about 1.05 to about 18, more preferably substantially within a range of about 1.1 to about 10, and most preferably substantially within a range of about 1.15 to about 1.3.

The main body portion 36 of the container 10 also preferably includes a label panel 56 one a front surface thereof that is adapted to receive an adhesive label, which may identify the contents of the container 10. The label panel 56 is preferably shaped so as to be convex as viewed in the horizontal cross-section, and so as to be substantially flat as viewed in longitudinal cross-section. The side edges of the label panel 56 are preferably shaped so as to smoothly transition into an outermost curved surface 58 of the container 10. The outermost curved surface 58 of the container 10 preferably represents the maximum outer diameter of the container 10, and is preferably shaped substantially as a projection of a cylinder.

A transition surface 60 is provided between the outermost curved surface 58 and a surface of the sidewall 12 that defines the innermost surface of the finger access opening 46. It is important that the transition surface 60 be shaped smoothly so as to avoid any abrupt changes in shape. Any such abrupt shape changes could cause undesirable stresses in the material of the sidewall 12 during the extrusion blow molding process as the mold parts that define the finger access opening 46 are pressed together.

The outermost curved surface 58 of the container 10 also preferably includes a first bumper portion 62 that extends above the label panel 56 and a second bumper portion 64 that extends below the label panel 56. The first and second bumper portions 62, 64 provide protection for the label after it has been applied to the label panel 56, and also provide aesthetic advantages.

Figure 11:
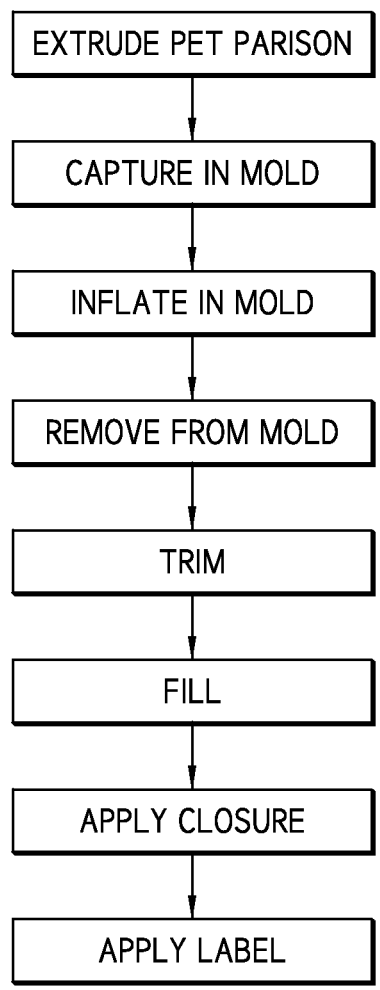
FIG. 11 is a flow diagram depicting a method that is performed according to the preferred embodiment of the invention.

As is diagrammatically depicted in FIG. 11, the container 10 preferably is manufactured using an extrusion blow molding process, in which a continuous hollow parison of extrudable PET material is extruded from an extrusion nozzle. A portion of the hollow parison is captured within a mold, which preferably is mounted on a shuttle or a wheel so as to match the speed of the extruded parison. The interior surfaces of the mold are configured to substantially match the desired final exterior shape of the container 10 as it has been described above. After the portion of the parison has been captured within the mold, it is inflated against the inner surface of the mold to form a container blank.

The container blank is then removed from the mold, and is trimmed in order to remove flash material. For example, the portion of the container blank corresponding to the finger access opening 46 of the container 10 will be a continuous sheet of flash material that must be removed in order to complete the manufacture of the container 10.

The container 10 will be filled with product in a packaging facility, a closure will be applied and an adhesive label may be applied to the label panel 56. Multiple filled containers 10 will then be boxed and palletized for transportation and distribution to wholesalers and retailers. During the transportation process, substantial vertical compressive forces may be applied to the containers 10. However, the containers 10 will possess sufficient top load or column strength to endure such forces without any substantial buckling of the sidewall, particularly in the neck and shoulder areas.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An extrusion blowmolded PET container having superior top load strength characteristics, comprising:
    a sidewall having an outer surface and an inner surface that defines an interior space, the sidewall being fabricated from material comprising extrudable PET, and wherein the sidewall is shaped to define
    a bottom portion;
    a finish portion having an opening defined therein that is in communication with the interior space; and
    a main body portion, the main body portion having a neck surface, a shoulder surface and a fillet that is defined between the neck surface and the shoulder surface, wherein the neck surface forms a first angle with respect to a longitudinal axis of the container that is within a range of 2° to 20°, and wherein the fillet has an average radius of curvature that is within a range of 15 mm to 55 mm.

2. An extrusion blowmolded PET container according to claim 1, wherein the first angle is further within a range of 3° to 14°.

3. An extrusion blowmolded PET container according to claim 2, wherein the first angle is further within a range of 4° to 8°.

4. An extrusion blowmolded PET container according to claim 1, wherein the fillet has an average radius of curvature that is within a range of 17 mm to 40 mm.

5. An extrusion blowmolded PET container according to claim 4, wherein the fillet has an average radius of curvature that is within a range of 20 mm to 28 mm.

6. An extrusion blowmolded PET container according to claim 1, wherein the shoulder surface forms a second angle with respect to a longitudinal axis of the container that is within a range of 35° to 65°.

7. An extrusion blowmolded PET container according to claim 6, wherein the second angle is within a range of 40° to 60°.

8. An extrusion blowmolded PET container according to claim 7, wherein the second angle is within a range of 45° to 55°.

9. An extrusion blowmolded PET container according to claim 1, wherein the main body portion has a handle portion defined therein and a finger access opening defined adjacent to the handle portion.

10. An extrusion blowmolded PET container according to claim 9, wherein the handle portion has a hollow interior that is part of the interior space of the container.

11. An extrusion blowmolded PET container according to claim 9, wherein the finger access opening has a concave upper surface.

12. An extrusion blowmolded PET container according to claim 11, wherein the concave upper surface includes a first curved portion that is proximate to the longitudinal axis of the container and a second curved portion that is proximate to the handle portion, and wherein the first curved portion has a radius of curvature that is greater than a radius of curvature of the second curved portion.

13. An extrusion blowmolded PET container according to claim 9, wherein the finger access opening has a maximum height that is within a range of-75 mm to 120 mm.

14. An extrusion blowmolded PET container according to claim 13, wherein the finger access opening has a maximum width that is within a range of-13 mm to 35 mm.

15. An extrusion blowmolded PET container according to claim 1, wherein said sidewall has a thickness in the main body portion that is within a range of 0.35 mm to 2 mm.

16. An extrusion blowmolded PET container according to claim 15, wherein said sidewall has a thickness in the main body portion that is within a range of 0.5 mm to 1.2 mm.

17. An extrusion blowmolded PET container according to claim 16, wherein said sidewall has a thickness in the main body portion that is within a range of 0.65 mm to 0.9 mm.

18. A method of making a PET container, comprising:
    continuously extruding a parison of a plastic material comprising PET;
    capturing a portion of the parison in a mold;
    inflating the captured portion of the parison against an interior of the mold in order to form a PET container having a main body portion with a neck surface, a shoulder surface and a fillet that is defined between the neck surface and the shoulder surface, wherein the neck surface forms a first angle with respect to a longitudinal axis of the container that is within a range of 2° to 20°, and wherein the fillet has an average radius of curvature that is-within a range of 15 mm to 55 mm; and
    removing the container from the mold.

19. A method of making a PET container according to claim 18, wherein the first angle is further within a range of 3° to 14°.

20. A method of making a PET container according to claim 19, wherein the first angle is further within a range of 4° to 8°.

21. A method of making a PET container according to claim 18, wherein the fillet has an average radius of curvature that is within a range of 17 mm to 40 mm.

22. A method of making a PET container according to claim 21, wherein the fillet has an average radius of curvature that is within a range of 20 mm to 28 mm.

23. A method of making a PET container according to claim 18, wherein the shoulder surface forms a second angle with respect to a longitudinal axis of the container that is within a range of 35° to 65°.

24. A method of making a PET container according to claim 23, wherein the second angle is within a range of 40° to 60°.

25. A method of making a PET container according to claim 24, wherein the second angle is within a range of 45° to 55°.

26. A plastic container, comprising:
a sidewall having an outer surface and an inner surface that defines an interior space, the sidewall being fabricated from a plastic material, and wherein the sidewall is shaped to define
a bottom portion;
a finish portion having an opening defined therein that is in communication with the interior space; and
a main body portion, the main body portion having a handle portion defined therein and a finger access opening defined adjacent to the handle portion, the finger access opening having a concave upper surface, and wherein the concave upper surface includes a first curved portion that is proximate to the longitudinal axis of the container and a second curved portion that is proximate to the handle portion, wherein the first curved portion has a radius of curvature that is greater than a radius of curvature of the second curved portion and wherein the second radius of curvature is within a range of 3 mm to 48 mm.

27. A plastic container according to claim 26, wherein the first radius of curvature is within a range of 5 mm to 50 mm.

28. A plastic container according to claim 26, wherein a ratio $R_2/R_3$ of the first and second radii is within a range of 1.05 to 18.

* * * * *